(12) United States Patent
Park et al.

(10) Patent No.: US 12,177,137 B1
(45) Date of Patent: Dec. 24, 2024

(54) SCALABLE VIRTUAL NETWORK SWITCH ARCHITECTURE

(71) Applicant: IEX GROUP, INC., New York, NY (US)

(72) Inventors: Robert Park, New York, NY (US); Lieting Yu, Warren, NJ (US); Jesse Brent Yates, Atlanta, GA (US); George Theodore Kyrazis, Jr., Ormond Beach, FL (US); Roger Frederick Kromann, Alpharetta, GA (US)

(73) Assignee: IEX Group, Inc., New York, NY (US)

( * ) Notice: Subject to any disclaimer, the term of this patent is extended or adjusted under 35 U.S.C. 154(b) by 348 days.

(21) Appl. No.: 17/684,058

(22) Filed: Mar. 1, 2022

(51) Int. Cl.
*H04L 49/00* (2022.01)
*G06F 9/455* (2018.01)
*H04L 12/46* (2006.01)

(52) U.S. Cl.
CPC .......... *H04L 49/70* (2013.01); *G06F 9/45558* (2013.01); *H04L 12/4675* (2013.01);
(Continued)

(58) Field of Classification Search
CPC . H04L 49/70; H04L 12/4675; G06F 9/45558; G06F 2009/45562; G06F 2009/4557; G06F 2009/45595
(Continued)

(56) References Cited

U.S. PATENT DOCUMENTS

| | | |
|---|---|---|
| 4,736,294 A | 4/1988 | Gill et al. |
| 5,339,392 A | 8/1994 | Risberg et al. |

(Continued)

FOREIGN PATENT DOCUMENTS

| | | |
|---|---|---|
| AU | 2010330629 A1 | 2/2012 |
| AU | 2016200212 A1 | 2/2016 |

(Continued)

OTHER PUBLICATIONS

Sheldon, et al., "The Effect of Latency on User Perfomance in Warcraft III," Worcester Polytechnic Institute, CS Dept., 2003.
(Continued)

*Primary Examiner* — Obaidul Huq
(74) *Attorney, Agent, or Firm* — Goodwin Procter LLP

(57) ABSTRACT

Embodiments of an overlay network with innovative virtual network switches and related network interface controllers are disclosed. According to one embodiment, the overlay network may comprise at least one virtual network switch (VNS), wherein each VNS is installed within a corresponding first processing endpoint which is logically above a virtualization layer of a virtual network. And, the VNS may be configured to intercept data packets transmitted on a network layer logically below the virtualization layer of the virtual network. The VNS may comprise: (a) a manager element configured to connect to at least one virtual network interface controller (VNIC), each VNIC being installed within a corresponding second processing endpoint of the virtual network, the second processing endpoint being separate from the first processing endpoint; (b) a replicator node configured to replicate and route the data packets; and (c) a switch controller configured to control the first replicator node.

20 Claims, 6 Drawing Sheets

(52) U.S. Cl.
CPC ............. *G06F 2009/45562* (2013.01); *G06F 2009/4557* (2013.01); *G06F 2009/45595* (2013.01)

(58) Field of Classification Search
USPC ................................................. 370/241, 252
See application file for complete search history.

(56) References Cited

U.S. PATENT DOCUMENTS

| | | |
|---|---|---|
| 6,278,982 B1 | 8/2001 | Korhammer et al. |
| 6,567,815 B1 | 5/2003 | Rubin et al. |
| 6,618,707 B1 | 9/2003 | Gary |
| 6,681,232 B1 | 1/2004 | Sistanizadeh et al. |
| 6,718,361 B1 | 4/2004 | Basani et al. |
| 6,970,924 B1 | 11/2005 | Chu et al. |
| 6,996,540 B1 | 2/2006 | May |
| 7,552,077 B1 | 6/2009 | Schluetter et al. |
| 7,752,115 B2 | 7/2010 | Schluetter |
| 7,873,561 B1 | 1/2011 | Adcock et al. |
| 8,090,637 B2 | 1/2012 | Schluetter et al. |
| 8,112,347 B2 | 2/2012 | Farrell et al. |
| 8,301,547 B2 | 10/2012 | Sulavka |
| 8,306,901 B1 | 11/2012 | Gastineau et al. |
| 8,315,940 B2 | 11/2012 | Winbom et al. |
| 8,489,747 B2 | 7/2013 | Aisen et al. |
| 8,589,260 B2 | 11/2013 | Chambers et al. |
| 8,768,805 B2 | 7/2014 | Taylor et al. |
| 8,891,513 B1 | 11/2014 | Huang et al. |
| 8,984,137 B2 | 3/2015 | Aisen et al. |
| 9,082,119 B2 | 7/2015 | Ortiz et al. |
| 9,727,602 B2 | 8/2017 | Djurdjevic et al. |
| 9,922,436 B2 | 3/2018 | Iannaccone et al. |
| 9,928,548 B2 | 3/2018 | Schmidt et al. |
| 9,940,670 B2 | 4/2018 | Aisen et al. |
| 9,959,572 B2 | 5/2018 | Iannaccone et al. |
| 10,127,612 B2 | 11/2018 | Mannix |
| 2002/0023048 A1 | 2/2002 | Buhannic et al. |
| 2002/0156721 A1 | 10/2002 | Lyback et al. |
| 2002/0174130 A1 | 11/2002 | Wagner |
| 2003/0177086 A1 | 9/2003 | Gomber et al. |
| 2003/0231741 A1 | 12/2003 | Rancu et al. |
| 2004/0024689 A1 | 2/2004 | Zhou et al. |
| 2004/0059666 A1 | 3/2004 | Waelbroeck et al. |
| 2004/0133590 A1 | 7/2004 | Henderson et al. |
| 2004/0210511 A1 | 10/2004 | Waelbroeck et al. |
| 2005/0074033 A1 | 4/2005 | Chauveau |
| 2005/0075963 A1 | 4/2005 | Balabon |
| 2005/0131802 A1 | 6/2005 | Glodjo |
| 2005/0137961 A1 | 6/2005 | Brann et al. |
| 2005/0234805 A1 | 10/2005 | Robertson et al. |
| 2006/0106713 A1 | 5/2006 | Tilly et al. |
| 2006/0259397 A1 | 11/2006 | Schluetter |
| 2006/0259417 A1 | 11/2006 | Marynowski et al. |
| 2007/0025351 A1 | 2/2007 | Cohen |
| 2007/0070914 A1 | 3/2007 | Abigail |
| 2007/0198397 A1 | 8/2007 | McGinley et al. |
| 2007/0265043 A1 | 11/2007 | Wang et al. |
| 2008/0172321 A1 | 7/2008 | Bartko et al. |
| 2009/0024498 A1 | 1/2009 | Berezuk et al. |
| 2009/0089199 A1 | 4/2009 | Waelbroeck et al. |
| 2009/0099952 A1 | 4/2009 | Wahlberg |
| 2009/0132412 A1 | 5/2009 | Cleary Neubert et al. |
| 2009/0157452 A1 | 6/2009 | Arora et al. |
| 2009/0182683 A1 | 7/2009 | Taylor et al. |
| 2009/0300605 A1* | 12/2009 | Edwards ............ G06F 9/45558 718/1 |
| 2010/0088216 A1 | 4/2010 | Czupek et al. |
| 2010/0094743 A1 | 4/2010 | Robertson et al. |
| 2010/0174634 A1 | 7/2010 | Bartko et al. |
| 2010/0174770 A1 | 7/2010 | Pandya |
| 2010/0211520 A1 | 8/2010 | Oddie et al. |
| 2010/0306096 A1 | 12/2010 | Gorman |
| 2010/0318495 A1 | 12/2010 | Yan et al. |
| 2010/0332650 A1 | 12/2010 | Aisen et al. |
| 2011/0119176 A1 | 5/2011 | Hanson et al. |
| 2011/0178913 A1 | 7/2011 | Smith |
| 2011/0231298 A1 | 9/2011 | Adcock et al. |
| 2011/0313907 A1 | 12/2011 | Schluetter et al. |
| 2012/0022999 A1 | 1/2012 | Bartko et al. |
| 2012/0042080 A1 | 2/2012 | Aisen et al. |
| 2012/0095893 A1 | 4/2012 | Taylor et al. |
| 2012/0166327 A1 | 6/2012 | Amicangioli |
| 2012/0219283 A1 | 8/2012 | Sokolowski |
| 2012/0284167 A1 | 11/2012 | Dubey |
| 2012/0296796 A1 | 11/2012 | Smith |
| 2012/0323757 A1 | 12/2012 | Monroe |
| 2013/0013487 A1 | 1/2013 | Sellberg et al. |
| 2013/0151391 A1 | 6/2013 | Simonoff |
| 2013/0159449 A1 | 6/2013 | Taylor |
| 2013/0179319 A1 | 7/2013 | Barker et al. |
| 2013/0204760 A1 | 8/2013 | Decker et al. |
| 2013/0218739 A1 | 8/2013 | Kmiec et al. |
| 2013/0246239 A1 | 9/2013 | Cooke et al. |
| 2013/0297478 A1 | 11/2013 | Mannix |
| 2013/0308453 A1 | 11/2013 | Cook |
| 2013/0325684 A1 | 12/2013 | Vogler et al. |
| 2013/0329605 A1 | 12/2013 | Nakil et al. |
| 2014/0019323 A1 | 1/2014 | Blake |
| 2014/0081822 A1 | 3/2014 | Cushing |
| 2014/0095409 A1 | 4/2014 | Bohman |
| 2014/0143118 A1 | 5/2014 | Schwarz et al. |
| 2014/0172662 A1 | 6/2014 | Weiss et al. |
| 2014/0279342 A1 | 9/2014 | Maynard |
| 2014/0279552 A1 | 9/2014 | Ortiz et al. |
| 2015/0066727 A1 | 3/2015 | Wepsic et al. |
| 2015/0073970 A1 | 3/2015 | Merold et al. |
| 2015/0081508 A1 | 3/2015 | Schwall et al. |
| 2015/0127519 A1 | 5/2015 | Melton |
| 2015/0235212 A1 | 8/2015 | Ortiz et al. |
| 2015/0261625 A1 | 9/2015 | Cape et al. |
| 2015/0302441 A1 | 10/2015 | Katsuyama et al. |
| 2015/0381484 A1* | 12/2015 | Hira ........................ H04L 45/64 370/392 |
| 2015/0381488 A1* | 12/2015 | Chanda ............... H04L 47/2441 370/392 |
| 2016/0019536 A1 | 1/2016 | Ortiz et al. |
| 2016/0055581 A1 | 2/2016 | Katsuyama et al. |
| 2016/0078537 A1 | 3/2016 | Katsuyama et al. |
| 2016/0078538 A1 | 3/2016 | Katsuyama et al. |
| 2016/0104155 A1 | 4/2016 | McGaugh et al. |
| 2016/0104242 A1 | 4/2016 | Melton |
| 2016/0173364 A1 | 6/2016 | Pitio et al. |
| 2016/0182330 A1 | 6/2016 | Iannaccone et al. |
| 2016/0189260 A1 | 6/2016 | Nagla |
| 2016/0196606 A1 | 7/2016 | Damodaran |
| 2016/0205174 A1 | 7/2016 | Pitio et al. |
| 2016/0210626 A1 | 7/2016 | Ortiz et al. |
| 2016/0260173 A1 | 9/2016 | Aisen et al. |
| 2016/0267082 A1 | 9/2016 | Wong et al. |
| 2016/0277348 A1 | 9/2016 | Pitio |
| 2017/0017958 A1 | 1/2017 | Scott et al. |
| 2017/0039648 A1 | 2/2017 | Aisen et al. |
| 2017/0097973 A1 | 4/2017 | Iannaccone et al. |
| 2017/0124494 A1 | 5/2017 | Hristoskov et al. |
| 2017/0161735 A1 | 6/2017 | Ortiz et al. |
| 2017/0186085 A1 | 6/2017 | Nagla |
| 2017/0230447 A1 | 8/2017 | Harsha |
| 2017/0249622 A1 | 8/2017 | Ortiz et al. |
| 2017/0279736 A1 | 9/2017 | Pitio et al. |
| 2017/0330181 A1 | 11/2017 | Ortiz |
| 2018/0018723 A1 | 1/2018 | Nagla et al. |
| 2018/0047065 A1 | 2/2018 | Wildberger |
| 2018/0054363 A1 | 2/2018 | Ngampornsukswadi et al. |
| 2018/0075527 A1 | 3/2018 | Nagla et al. |
| 2018/0082678 A1 | 3/2018 | Olmstead et al. |
| 2018/0158143 A1 | 6/2018 | Schmitt et al. |
| 2018/0191624 A1 | 7/2018 | Haynold |
| 2019/0087898 A1 | 3/2019 | Mannix |

(56) References Cited

U.S. PATENT DOCUMENTS

| | | |
|---|---|---|
| 2020/0211113 A1 | 7/2020 | Adcock et al. |
| 2021/0377166 A1 | 12/2021 | Brar et al. |

FOREIGN PATENT DOCUMENTS

| | | | |
|---|---|---|---|
| AU | 2016231624 A1 | 10/2016 | |
| AU | 2015327722 A1 | 4/2017 | |
| AU | 2015330644 A1 | 4/2017 | |
| AU | 2016208989 A1 | 8/2017 | |
| AU | 2016224908 A1 | 9/2017 | |
| AU | 2016287789 A1 | 2/2018 | |
| BR | 112012013891 A2 | 5/2016 | |
| CA | 2707196 A1 | 1/2011 | |
| CA | 2927532 A1 | 1/2011 | |
| CA | 2927607 A1 | 1/2011 | |
| CA | 2681251 A1 | 3/2011 | |
| CA | 2706252 A1 | 3/2011 | |
| CA | 2777438 A1 | 11/2012 | |
| CA | 2871322 A1 | 3/2014 | |
| CA | 2830260 A1 | 4/2014 | |
| CA | 2844318 A1 | 9/2014 | |
| CA | 2961916 A1 | 4/2016 | |
| CA | 2963287 A1 | 4/2016 | |
| CA | 2913700 A1 | 6/2016 | |
| CA | 2916284 A1 | 6/2016 | |
| CA | 2970743 A1 | 6/2016 | |
| CA | 2974151 A1 | 7/2016 | |
| CA | 2922072 A1 | 8/2016 | |
| CA | 2978488 A1 | 9/2016 | |
| CA | 2980196 A1 | 9/2016 | |
| CA | 2991073 A1 | 1/2017 | |
| CA | 2910754 A1 | 4/2017 | |
| CA | 3000464 A1 | 4/2017 | |
| CA | 3000466 A1 | 4/2017 | |
| CA | 2952874 A1 | 6/2017 | |
| CA | 2970686 A1 | 12/2017 | |
| CA | 2976505 A1 | 2/2018 | |
| CA | 2976618 A1 | 2/2018 | |
| CA | 2963767 A1 | 3/2018 | |
| CN | 105978756 A | 9/2016 | |
| CN | 107004190 A | 8/2017 | |
| CN | 107004195 A | 8/2017 | |
| CN | 107408253 A | 11/2017 | |
| EP | 2510451 A1 | 10/2012 | |
| EP | 3201856 A1 | 8/2017 | |
| EP | 3234792 A1 | 10/2017 | |
| EP | 3248159 A1 | 11/2017 | |
| EP | 3260979 A1 | 12/2017 | |
| EP | 3269090 A1 | 1/2018 | |
| EP | 3272082 A1 | 1/2018 | |
| EP | 3317833 A1 | 5/2018 | |
| JP | H11-212913 A | 8/1999 | |
| JP | 2005-348262 A | 12/2005 | |
| JP | 2006-511884 A | 4/2006 | |
| JP | 2008-102637 A | 5/2008 | |
| JP | 2011-192217 A | 9/2011 | |
| KR | 10-2002-0012538 | 2/2002 | |
| KR | 10-2012-0092880 A | 8/2012 | |
| KR | 20180026498 A | 3/2018 | |
| MX | 2012006659 A | 1/2013 | |
| MX | 2017011021 A | 1/2018 | |
| SG | 10201704581 | 7/2017 | |
| SG | 11201501568 S | 8/2017 | |
| SG | 11201707004 | 9/2017 | |
| WO | 2000/50974 A2 | 8/2000 | |
| WO | 0201472 A1 | 1/2002 | |
| WO | 2006039815 A1 | 4/2006 | |
| WO | 2008019465 A1 | 2/2008 | |
| WO | 2011/069234 A1 | 6/2011 | |
| WO | 2013/184846 A1 | 12/2013 | |
| WO | 2014043420 A1 | 3/2014 | |
| WO | 2016/049745 A1 | 4/2016 | |
| WO | 2016/054727 A1 | 4/2016 | |
| WO | 2016/095012 A1 | 6/2016 | |
| WO | 2016/115620 A1 | 7/2016 | |
| WO | 2016/135705 A1 | 9/2016 | |
| WO | 2016/141491 A1 | 9/2016 | |
| WO | 2016/149807 A1 | 9/2016 | |
| WO | 2017/000061 A1 | 1/2017 | |
| WO | 2017/054094 A1 | 4/2017 | |
| WO | 2017/054095 A1 | 4/2017 | |
| WO | 2017/136956 A1 | 8/2017 | |
| WO | 2017/143435 A1 | 8/2017 | |
| WO | 2017/152265 A1 | 9/2017 | |
| WO | 2018/010009 A1 | 1/2018 | |
| WO | 2018/014123 A1 | 1/2018 | |
| WO | 2018/049523 A1 | 3/2018 | |
| ZA | 2012/05093 B | 2/2014 | |

OTHER PUBLICATIONS

Hu, E., "International Access Delays, Market Quality, and Price Discovery: Evidence from IEX Becoming an Exchange," Division Economic and Risk Analysis Working Paper Series, U.S. Securities and Exchange Commision, 2018.

Harris, L., "What to do about High Frequency Trading," CFA Institute, Enterprising Investor, 2017.

Harris, L., "Stop the high-frequency trader arms race," Financial Times, Opinion, FT Trading Room, Dec. 27, 2012.

International Search Report and Written Opinion for PCT/US2023/014021, mailed on Jun. 15, 2023, 228 pages.

Foley, S., "High Frequency traders face speed limits" Financial & Markets Regulation, The Financial Times Limited, Apr. 28, 2013. (Year: 2013).

Jones, H., "EU lawmaker turns screw on ultra-fast trading", Reuters, Mar. 26, 2012 (Year: 2012).

Kawanishi, T., et al., "Impact of wave propagation delay on latency in optical communication systems," Proc. SPIE 3646, Optical Metro Networks and Short-Haul Systems V, 86460C (Feb. 5, 2013) (Year: 2013).

Lowenstein, R., "A Speed Limit for the Stock Market", The New York Times, Oct. 1, 2012 (Year. 2012).

Pearl, M, "Computer Networks UNISA—Chap 3—Transmission Basics and Networking Media", http://geekswithblogs.net/MarkPearl/archive/2012/01/13/computer-networks-unisa—Jan. 14, 2012 (Year: 2012).

Bowley, G., "Clamping Down on Rapid Trades in Stock Market", The New York Times, Oct. 8, 2011 (Year: 2011).

Eubanks, W., "The European Union's Response to the 2007-2009 Financial Crisis", Congressional Research Service, Specialist in Financial Economics (Year: 2010).

Kirilenko, A. "Latency and Asset Prices",; MIT Sloan School of Management; Guilherme Lamacie—Jan. 7, 2015 (Year: 2015).

Saving the world with Tudor Jones, Part 3, Willoughby, J. (1997). Saving the world with tudor jones, part 3. Institutional Investor, , 60. Retrieved from https://dialog.proquest.com/professional/docview/677541709?accountid=1422- 57 (Year: 1997).

Lewis, M., "The Wolf Hunters of Wall Street, An Adaption from Flash Boys: A Wall Street Revolt", New York Times article adapted from book (274 pp. W. W. & Company), http://www.nytimes.com/2014/04/06/magazine/flash-boys-michael-lewis.html.

International Search Report in PCT/US2013/059558, dated Mar. 20, 2014, 4 pages.

Third Party Observation in PCT/US2013/059558, sumbitted on Jun. 3, 2014, 2 pages.

International Preliminary Search Report for PCT/US2013/059558, dated Mar. 17, 2015, 8 pages.

Written Opinion for PCT/US2013/059558, dated Dec. 17, 2013, 7 pages.

Canadian Grant No. 2871322; Transmission Latency Leveling Apparatuses, Methods and Systems, IEX Group Inc.; 1 page; Feb. 22, 2018.

Notification of Grant and Examination Report; Singapore Patent Application No. 11201501568S; Transmission Latency Leveling Apparatuses, Methods and Systems, IEX Group Inc.; 5 pages; Aug. 11, 2017.

Schmerken, I., "PDQ ATS Launches a New Electronic Equity Auction for Large Orders", 1-4 pages, Sep. 22, 2014, Information

(56) References Cited

OTHER PUBLICATIONS

Week WallStreet & Technology, http://www.pdqats.com/pdq-ats-launches-a-new-electronic-equity-auction-fo- r-large-orders/.
Marcus, D., "Market structure evolution", 1-6 pages, Mar. 13, 2015, ParFx press release, https://www.parfx.com/news/press-releases/market-structure-evolution-by-d- an-marcus-ceo-parfx/.
"Notice of Filing of Proposed Rule Change to Modify Exchange Rule 3307 to Institute a Five Millisecond Delay in the Execution Time of Marketable Orders on NASDAQ OMX PSX, 1-12 pages, Aug. 17, 2012, U.S. Securities and Exchange Commission. File No. SR-Phlx-2012-106 Release No. 34-67680, https://www.sec.gov/rules/sro/phlx/2012/34-67680.pdf".
About ParFx, 1-2 pages, Sep. 11, 2013, ParFx Web Site, https://web.archive.org/web/20130911210916/http://www.parfx.com/about-par- fx.
Castaldo, J., "How Aequitas plans to build a kinder, gentler stock market", 1-12 pages, Mar. 26, 2015, Canadian Business http://www.canadianbusiness.com/innovation/aequitas-vs-hft/.
Klein, G., "HFT speed bump gets green light as OSC approves Aequitas Neo Exchange", 1-2 pages, Nov. 17, 2014, Resource Clips http://resourceclips.com/2014/11/17/hft-speed-bump-gets-green-light-as-os- c-approves-aequitas-neo-exchange/.
Schematic (Auction Process)/PDQ ATS, 1 page, Sep. 30, 2015, PDQ Web Site, https://web.archive.org/web/20150930073841/http://www.pdqats.com/platform- /process/.
Schmerken, I., "EBSs Plan to Slow Down HFT in FX Could Influence Other Regulators", 1-2 pages, Apr. 29, 2013, Information Week WallStreet & Technology, http://www.wallstreetandtech.com/exchanges/ebss-plan-to-slow-down-hft-in-fx-could-influence-other-regulators/a/d-id/1268077.
Application for Recognition of Aequitas Neo Exchange Inc. (Aequitas Neo Exchange) and its parent company, Aequitas Innovations Inc. (Aequitas), of Notice and Request for Comment, 1-41 pages, Jun. 27, 2014, Ontario Securities Commission, https://www.osc.gov.on.ca/documents/en/Marketplaces/xxr-aequitas_20140627- nrfc-application2.pdf.
Innovative Design to Promote Liquidity Formation, 1-2 pages, Apr. 5, 2015, Aequitas NEO Exchange Web Site, https://web.archive.org/web/20150405131256/https://www.aequitasneoexchang- e.com/en/trading/trading-solutions/neo-book/.
TMX Group to Streamline its Equities Trading Offering, 1-2 pages, Oct. 23, 2014, TMX Press Release, https://www.tmx.com/newsroom/press-releases?id=203&year=2014&month=10.
Third-party Submission Under 37CFR 1.290 for U.S. Appl. No. 14/688,463, filed Apr. 22, 2016, (18 pages).
"New Trading Platform to Tackle HFT," Compliance Reporter, London, UK (Jul. 29, 2013), https://search.proquest.com/docview/1430519512?accountid=14753, (3 pages).
Patterson, S., "Upstart Trading Platform Pitches itself as a Sanctum," Dow Jones Institutional News, New York, NY. Jul. 29, 2013, https://searchproquest.com/docview/2092612293?accountid=14753. (3 pages).

Bhupathi, T., "Technology's Latest Market Manipulator—High Frequency Trading: The Strategies, Tools, Risks, and Responses", NCJL and Tech, 11, 377, 2009, http ://scholarship .law. unc .edu/cgi/viewcontent.cgi?article=1168&context=ncjolt.
Mamudi, S., "IEX to Reveal Dark Pool Operations Data in Challenge to Peers", Bloomberg, Oct. 22, 2013, 2 pages.
Flitter, E., et al., "Insight Chicago Fed warned on high-frequency trading", Reuters Webpages, Sep. 30, 2012, http://www.reuters.com/article/us-markets-tech-breakdowns/ insight-ch icago-fed-warned-on-high-freq uency-trading-idUSBRE88TON F20121 001.
Form ATS; OMB No. 3235-0509; Initial Operation Report, Amendment to Initial Operation Report and Cessation of Operations Report for Alternative Trading System, 34 pages.
Int'l Search Report and Written Opinion of the ISA/US in PCT/US15/26168; dated Jul. 27, 2015; 7 pgs.
Int'l Search Report and Written Opinion of the ISA/US in PCT/US15/50708; dated Dec. 31, 2015; 6 pgs.
Kay, J., "Enduring lessons from the legend of Rothschild's carrier pigeon", Financial Times, May 28, 2013, https://www.ft.com/content/255b 75e0-c77d-11e2-be27-00144feab7de.
The News from Waterloo, archives org webpages, Sep. 12, 2015, https://web.archive.org/web/20150912031729/htlp://thenewsfromwaterloo.com/pigeon-post.html.
Young, T, How to Regulate a Secret The Clandestine Nature of High-Frequency Trading Makes It Nearly Impossible to Police, Thankfully, a New and Fairer Market Is Emerging, Intl Fin. L Rev, 3334, 2014, http://hei non li ne.org/HOUPage?hand le= hei n.journals/intfinr33&div=83&g_sent=1 &casa_token=&collection=journals.
Extended European Search Report issued for EP Application No. 20167210.2, mailed on Sep. 8, 2020 (11 pages).
Austrailian Examination Report 2, issued for Australian Application No. 2018217228, mailed on Mar. 18, 2020 (5 pages).
Kay, R. Pragmatic network latency engineering fundamental facts and analysis, cPacket Networks, White Paper, published 2009, pp. 1-31 <URL: http://nhne-pulse.org/wp-content/uploads/2011/01/Introduction_to_Network_Latency_Engineering.pdf>.
Austrailian Examination Report 1, issued for Australian Application No. 2020203050, mailed on Nov. 11, 2020 (8 pages).
English Translation of Brazilian Search Report Issued for Brazilian Application No. BR112015005550-8, mailed on Feb. 4, 2020 (3 pages).
English Translation of Korean Non-Final Office Action issued for 10-2017-7009413, mailed on Dec. 20, 2018 (9 pages).
English Translation of Korean Non-Final Office Action issued for 10-2019-7028733, mailed on Aug. 31, 2018 (5 pages).
Lass, Robert N. et al., "GUMP: Adapting Client/Server Messaging Protocols into Peer-to-Peer Serverless Environments", BADS '10: Proceedings of the 2nd workshop on Bio-inspired algorithms for distributed systems, Jun. 2010, pp. 39-46.
Office Action issued in Canadian patent application No. 3015052, mailed on Mar. 3, 2021.
Extended European Search Reporting issued for Application No. 20167210.2, mailed on Sep. 8, 2020.

* cited by examiner

SCALABLE VIRTUAL NETWORK SWITCH ARCHITECTURE

FIELD OF THE INVENTION

The present invention disclosed herein relates generally to technological advances in the apparatuses, methods, and systems for efficient communication in a distributed computing system. More particularly, embodiments of the present invention enable new types of virtual network switches and related network interface controllers for unparalleled flexibility, versatility, and reliability in the processing and transmission of communication data in and across different cloud networks.

BACKGROUND OF THE INVENTION

Cloud networks can provide computing and communication services by exposing network features through network virtualization layers. These virtualization layers must typically rely upon a combination of physical network components, low-level network provisioning and management software, optimization services and load-balancing services, and customer-accessible services and interfaces that allow cloud users to construct their cloud installations. From the perspective of the Open Systems Interconnection (OSI) model, this network virtualization layer sits above other layers such as the physical layer, the data link layer, etc. Such virtualization layers, if properly implemented and configured, could provide a broad swath of valuable capabilities along with the programming interfaces to extend and monitor them.

However, a number of deficiencies and challenges hinder the implementation and use of conventional network virtualization layers.

For example, cloud network virtualization is typically built on physical network components and other low-level network features, intentionally isolating users from these physical resources, and as a result, making it nearly impossible for anyone other than the owner or operator of a cloud network to change the characteristics and features of any particular network. Since each cloud network is built on a unique combination of physical hardware and with a unique set of implemented features, it is difficult to design and scale applications across different cloud networks. This also results in network-specific virtualization features that are difficult to scale across networks. Different public cloud providers tend to offer different features of network virtualization with varying performance. As a result, cloud users must either stick with one particular cloud network and its provider for all cloud computing and communication needs or deal with distinctive virtualization issues in connection with multiple networks.

In addition, the requirement to satisfy the largest possible number of customers drives the features of existing virtualization layers to focus only on critical areas such as security, scalability, reliability, and performance. In meeting those common demands, existing network virtualization often excludes many other features typically supported by bare-metal (physical) networks.

Moreover, conventional network virtualization approaches tend to focus on consolidating the features and capabilities of a cloud network's control plane as opposed to its data plane. As a result, the details of underlying network activities, such as data paths, performance specifics, etc., are hidden from the users.

FIG. 1 shows a diagram of a cloud network topology illustrating how network virtualization is implemented in a conventional manner. As shown, a cloud provider typically manages the necessary physical network infrastructure (104) on top of a data center infrastructure (102A, 102B, . . . 102M). The cloud provider, being familiar with and/or in control of the physical network infrastructure, is able to expose a number of network services to users of a virtual network (VNet) (106) comprising multiple virtual machines (VMs) (106A, 106B, 106C, . . . 106N).

As noted above, users of the VMs are only able to access the network services that the cloud provider chooses to expose through virtualized features presented via the VNet. Since the VMs are logically located above the virtualization layer with provider-specific services/features, users of the VNet or VMs are far removed from the lower layers (of the OSI model) and therefore have limited visibility into or control over the movement and processing of data packets in the underlying network.

Other deficiencies or shortcomings may also exist.

SUMMARY OF THE INVENTION

Embodiments of the present invention overcome at least some of the deficiencies and shortcomings in the prior art approach for the implementation and operation of virtual networks.

According to one particular embodiment, an overlay network may comprise at least one virtual network switch (VNS) wherein each VNS may be installed within a corresponding first processing endpoint which is logically above a virtualization layer of a virtual network. The VNS may be configured to intercept data packets transmitted on a network layer logically below the virtualization layer of the virtual network. The VNS may comprise: (a) a manager element configured to connect to at least one virtual network interface controller (VNIC), each VNIC being installed within a corresponding second processing endpoint of the virtual network, the second processing endpoint being separate from the first processing endpoint; (b) a replicator node configured to replicate and route the data packets; and (c) a switch controller configured to control the first replicator node.

According to another particular embodiment, a method for operating an overlay network may be provided, wherein the overlay network comprises at least one virtual network switch (VNS), each VNS being installed within a corresponding first processing endpoint which is logically above a virtualization layer of a virtual network. The method may comprise the step of connecting, by a manager element of the VNS, to at least one virtual network interface controller (VNIC), each VNIC being installed within a corresponding second processing endpoint of the virtual network, and the second processing endpoint being separate from the first processing endpoint. The VNS is configured to intercept data packets transmitted on a network layer logically below the virtualization layer of the virtual network. The method may also comprise the step of replicating, by a replicator node of the VNS, data packets received from the at least one VNIC. The method may further comprise the step of routing, by the replicator node, the data packets according to control by a switch controller of the VNS.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Embodiments of the present invention provide new types of overlay networks that sit logically above a virtualization layer of a virtual network but behave like a lower OSI layer of physical network infrastructure. Such overlay networks may include at least one virtual network switch (VNS) that intercepts data packets transmitted in an underlying network layer and then processes and routes those packets in a manner transparent to and controllable by users of the virtual network. The VNS may transmit the data packets to other VNS instances and/or one or more virtual network interface controllers (VNICs) in the overlay network.

By implementing and configuring such VNS and VNIC instances in processing endpoints within the virtual network, embodiments of the present invention can achieve a number of benefits over conventional virtual switches and virtual networks, such as providing end-to-end visibility of the data path, flexibility in packet processing/routing with more packet protocol types and network features (e.g., automated protocol selection, reconfigurable switch meshes for optimized routing), scalability of switch capacity and performance (based on the use of elastic cloud resources), more opportunities for inserting network functions, the ability to create a virtual network spanning hybrid networks, among other benefits.

The implementations and operations of exemplary VNS and VNIC instances are described below in connection with the drawings.

Figure 1:
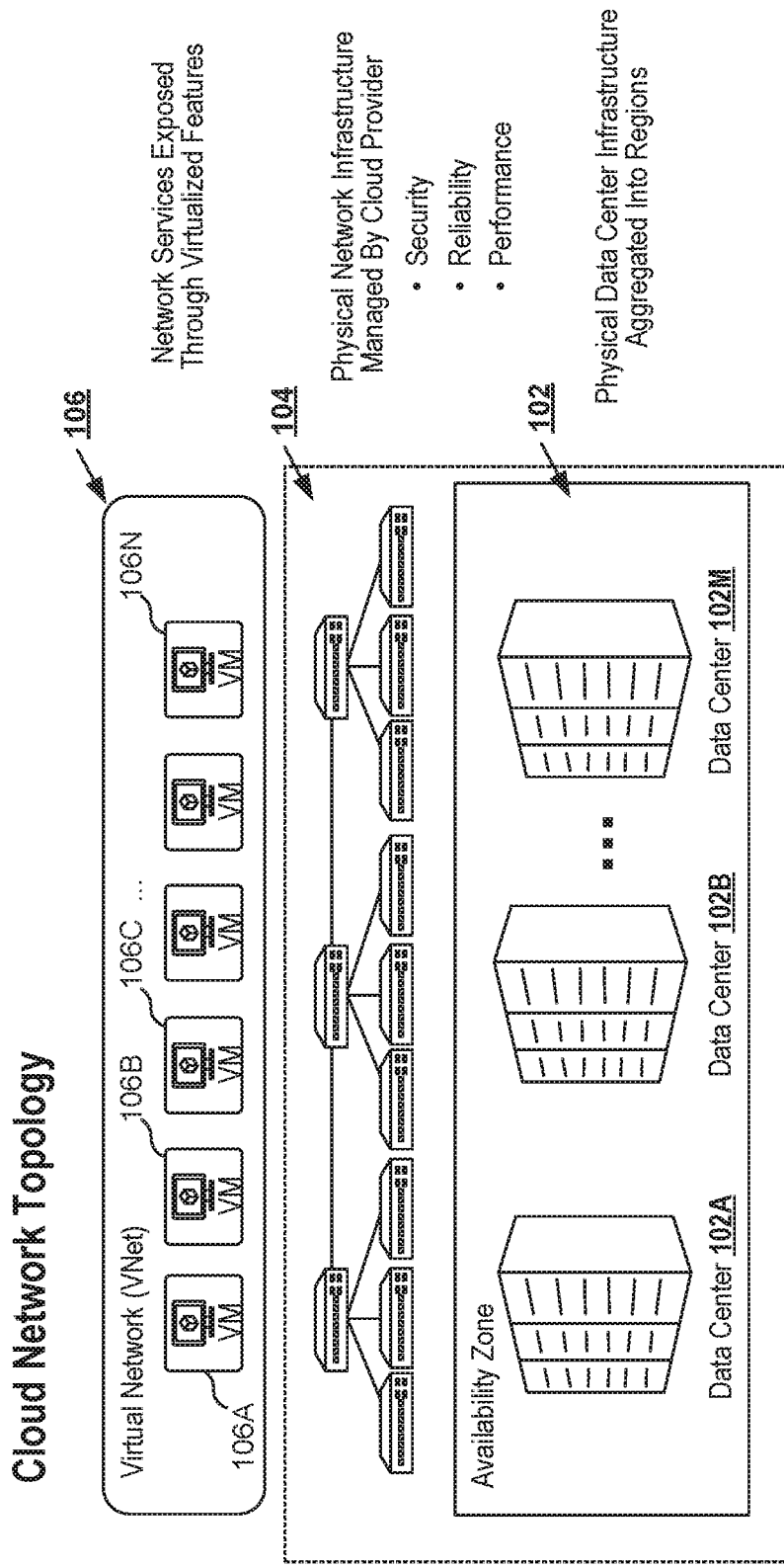
FIG. 1 is a diagram of a cloud network topology illustrating how network virtualization is implemented in a conventional manner.
Figure 2:
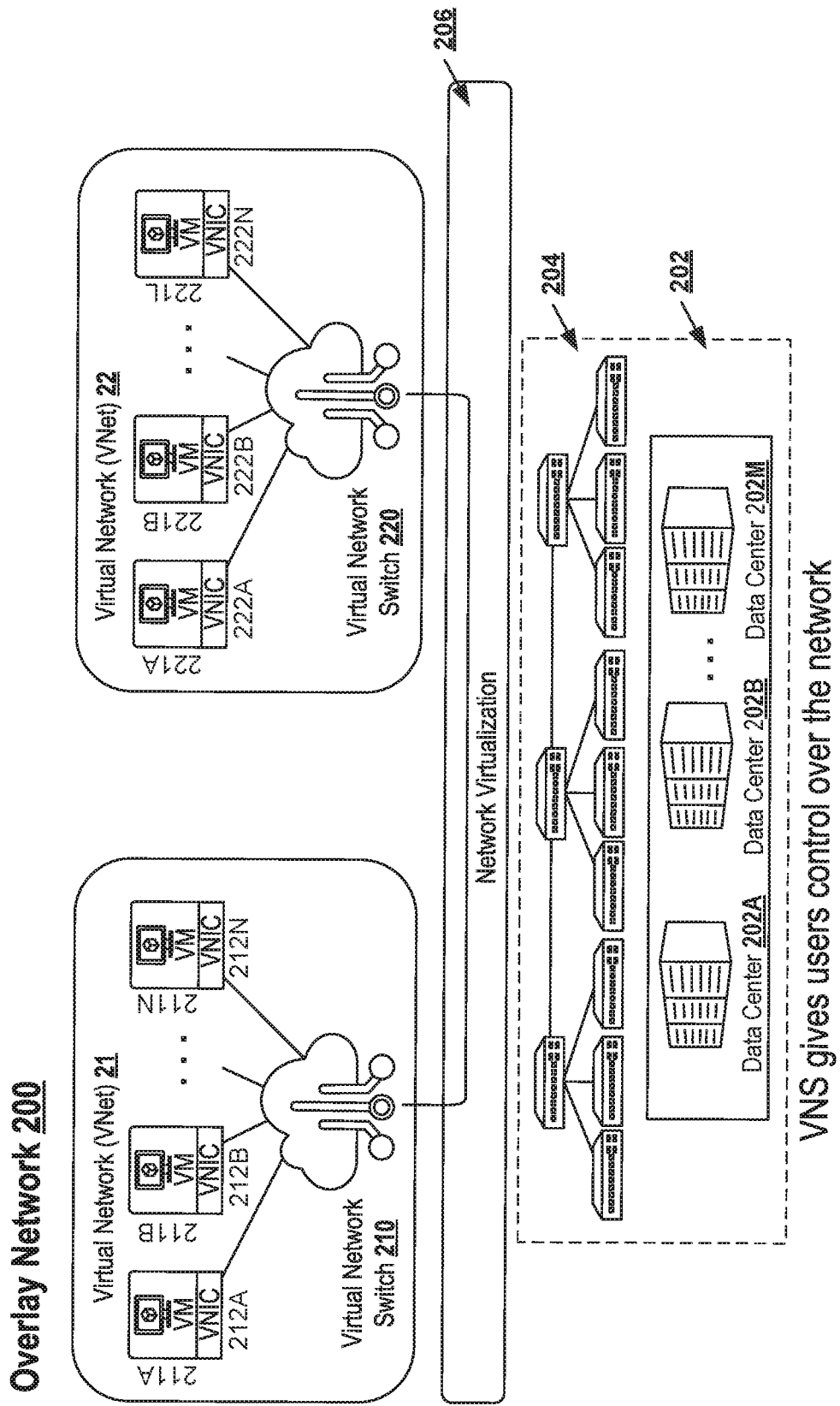
FIG. 2 is a diagram illustrating an exemplary overlay network including virtual network switches and virtual network interface controllers according to embodiments of the present invention.

Referring now to FIG. 2, there is shown a diagram illustrating an exemplary overlay network 200 according to embodiments of the present invention.

The overlay network 200 may include one or more virtual networks (VNets), such as VNets 21 and 22, implemented on top of a physical network infrastructure (204) and data centers (202A, 202B, . . . 202M). Logically, the overlay network 200 sits above a network virtualization layer 206 that abstracts the underlying resources provided by the network infrastructure (204) and data centers (202A, 202B, . . . 202M).

The overlay network 200 may further include virtual network switches (VNSs) (210, 220) communicating with each other and with processing endpoints in their respective virtual networks (VNets) (21, 22).

According to one particular embodiment of the present invention, the processing endpoints in VNet 21 may include a first group of VMs (211A, 211B, . . . 211N). According to other embodiments, the processing endpoints may be any one or more of software containers, serverless compute functions, or even physical hardware. Each of these VMs (or other types of processing endpoints) may include or be operatively coupled to a virtual network interface controller (VNIC) (212A, 212B, . . . 212N) configured to interact with the VNS 210. The VNS 210 itself may also be installed in a processing endpoint (which may be one or more of software containers, serverless compute functions, or physical hardware).

Similarly, VNet 22 may include processing endpoints such as a second group of VMs (221A, 221B, . . . 221L) coupled with their respective VNICs (222A, 222B, . . . 222L), and the VNS 220—also installed in a processing endpoint—may communicate with the second group of VMs via their respective VNICs.

Each of VNS 210 and VNS 220 may be programmed or configured to intercept data packets or data streams transmitted from various sources on a lower layer in the OSI model. The VNS instance may then process and route the intercepted data much like a device in the physical network infrastructure 204. For example, VNS 210 may intercept a data stream from a remote data source (e.g., an online game server, a stock exchange, a traffic database) and fan the stream out to the first group of VMs (211A, 211B, . . . 211N) via their respective VNICs (212A, 212B, . . . 212N). VNS 210 may also receive data from and/or send data to VNS 220 which in turn could process the data and route them to the second group of VMs (221A, 221B, . . . 221L) via their respective VNICs (222A, 222B, . . . 222L). In both VNets 21 and 22, the VNICs are responsible for creating network connections with a corresponding VNS and optimizing packet delivery to and retrieval from the respective processing endpoints (e.g., VMs).

Thus, the VNS and VNIC instances collectively form the overlay network 200 which behaves like the lower-level network infrastructure 204 even though it is logically situated above the network virtualization layer 206.

The overlay network 200 may be scaled by adding or removing VNS and VNIC instances as needed, even though two sets are shown in FIG. 2. For example, by leveraging elastic cloud resources, users may also scale the VNS vertically by constructing larger or smaller switches having desired amount of switch resources (e.g., ports, bandwidth, etc.). Alternatively or additionally, users could scale the overlay network horizontally by building meshes comprised of a large number of individual VNS switches in a tree or other arrangement to provide performance or reliability scaling. The mesh capability also allows the overlay to be expanded to encompass more than one type of network. For example, with the mesh, one VNS could be in AWS while another may be in Azure, while a third may be in an on-premises datacenter. With the mesh, all three locations will look as if they are on the same network, and applications running in each can easily and efficiently communicate with other applications in any of the three networks.

It should be noted that, while FIG. 2 appears to show the overlay network 200 being deployed in connection with only one cloud network (with one common set of data center infrastructure 202 and physical network infrastructure 204), the overlay network could span across two or more cloud networks supported by one or more infrastructure resources offered by one or more cloud providers such as Amazon Web Services (AWS), Google Cloud, and Microsoft Azure.

According to some embodiments of the invention, the scaling of the overlay network including the VNS instances could enable users to create a local area network (LAN) across hybrid virtual networks which may include on-premises, cloud-hosted, edge-hosted, and/or mobile-based computing and communication resources.

Figure 3:
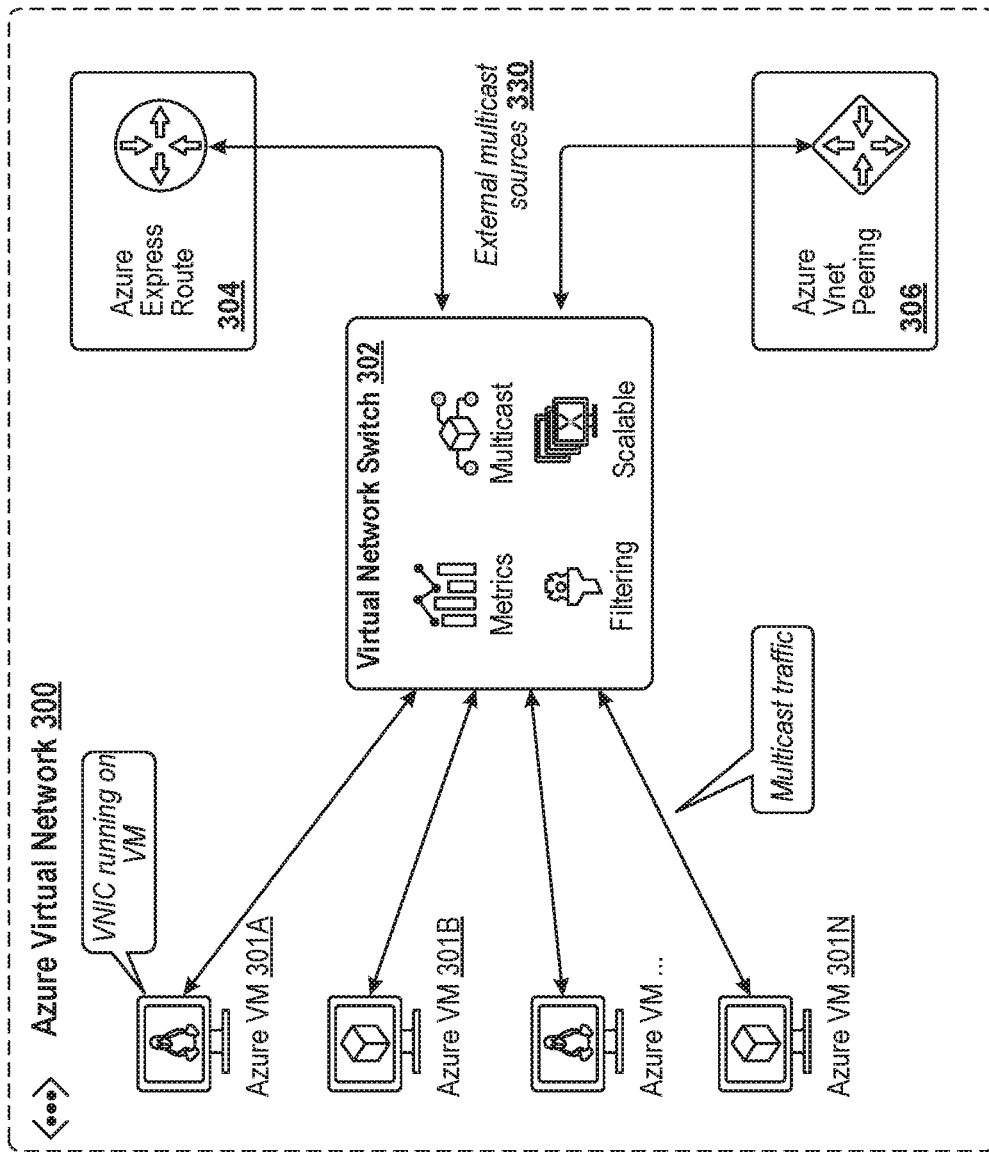
FIG. 3 is a diagram illustrating another exemplary overlay network employing a virtual network switch according to an embodiment of the present invention.

Referring now to FIG. 3, there is shown a diagram illustrating another exemplary overlay network 300 employing a virtual network switch 302 according to an embodiment of the present invention.

In this particular embodiment, VNS 302 is implemented in an Azure VNet 300. VNS 302 may be a network virtual appliance (NVA) that runs on one or more virtual machines, e.g., within the Azure cloud environment. VNS 302 is responsible for packet routing, filtering, and/or fanout.

For example, VNS 302 may ingest data packets or data streams from external multicast sources 330. The external sources 330 may include databases on a user's own premises and the data may be delivered via private connections using a virtual private cloud connection, e.g., Azure ExpressRoute 304. Alternatively or additionally, the external sources 330 may be located in one or more other Azure VNets (not shown), and the data connections between them and VNS 302 may be established via virtual network peering, e.g., Azure VNet Peering 306.

Within Azure VNet 300, VNS 302 may be in communication with Azure VMs (301A, 301B, ... 301N) via their respective VNIC instances (not shown). VNS 302 may filter the data packets from the external multicast sources 330 and then route them to some or all of the Azure VMs, thereby achieving multicast functions efficiently.

Figure 4:
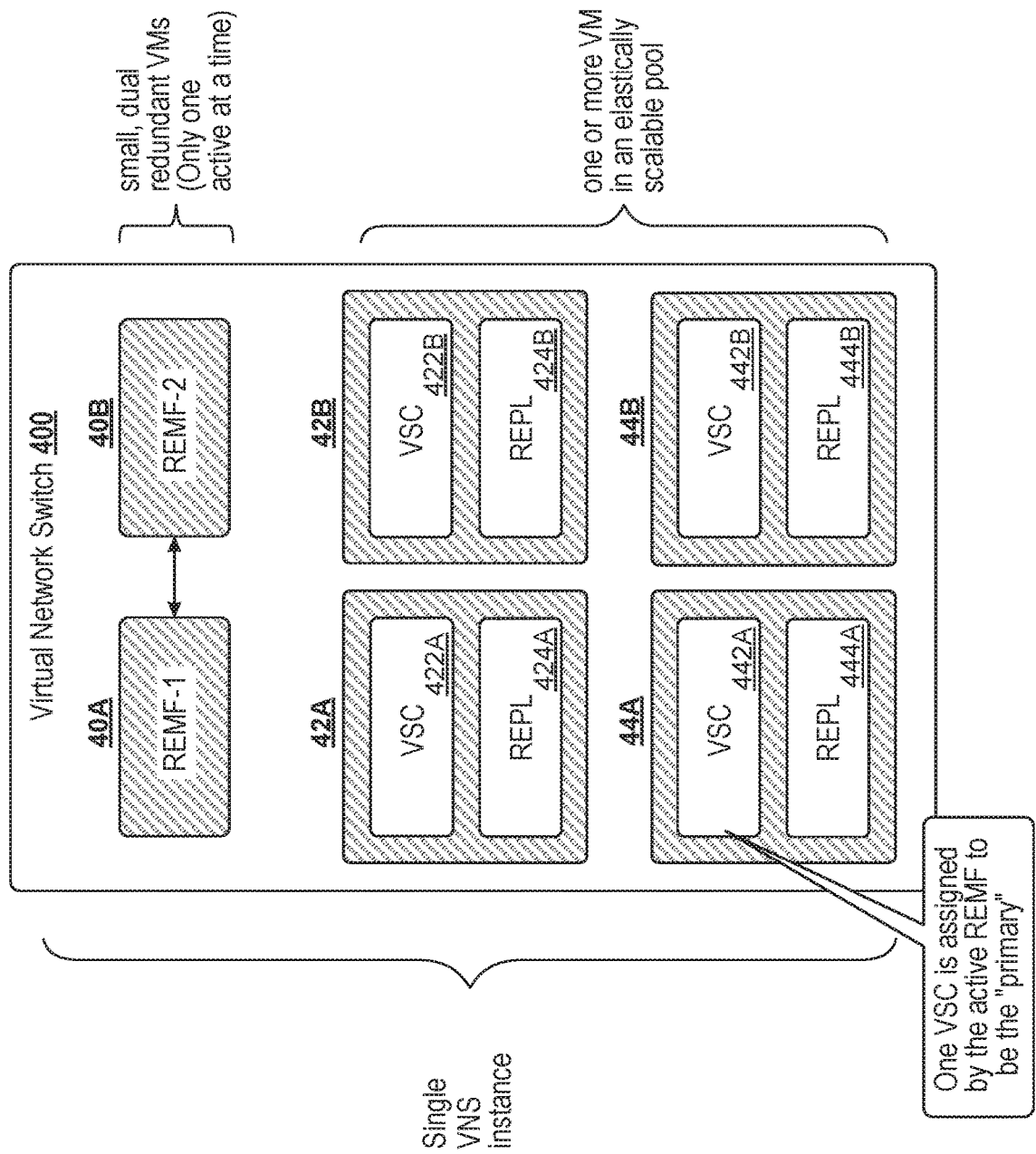
FIG. 4 is a diagram illustrating an exemplary virtual network switch according to an embodiment of the present invention.

FIG. 4 is a diagram illustrating an exemplary virtual network switch 400 according to an embodiment of the present invention.

VNS 400 may be an NVA implemented as a software system running on one or more VMs (or other processing endpoints such as software containers, serverless compute functions, or physical hardware). In the particular example illustrated in FIG. 4, VNS 400 includes six distinct VMs (40A, 40B, 42A, 42B, 44A, 44B) represented by shaded boxes. These underlaying VMs are presented to users as a single VNS instance.

The number of component VMs can be increased or decreased to change the performance of the VNS instance. This elasticity is a desirable feature for users as it enables the most efficient use of computing resources (e.g., the underlaying cloud infrastructure) while preserving the ability to dynamically adapt to changing workloads. The elasticity can be adjusted automatically via smart algorithms such as artificial intelligence (AI) or machine learning (ML) models, or the scaling can be changed manually based on user settings.

In FIG. 4, the component VMs of the exemplary VNS 400 may be divided into two groups: (1) a redundant pair of VMs (40A, 40B) to serve as a manager of VNS 400; and (2) an elastically scalable pool of VMs (42A, 42B, 44A, 44B) executing switching and routing functions.

VNS 400 runs a Remote Element Management Function (REMF) on small, dual redundant VMs (40A, 40B) where only one (or selected few) of these VMs may be active at any given time. The REMF application on the active VM (e.g., 40A) may serve as the main control point for VNS 400. There is typically at least one REMF (or two in redundant setups) for each VNS instance no matter how many VMs are used to implement the VNS. All VNIC instances connect with the REMF first in order to join its overlay network, and the REMF is configured to facilitate some or all metrics and API calls for VNS 400. According alternative embodiments of the present invention, two or more REMF nodes may be active at the same time in which case the VNICs may connect simultaneously to all active REMF nodes and the REMF nodes will share state among themselves. The advantages of this alternative implementation would be quicker failover recovery and load balancing while the disadvantage is more complexity.

VNS 400 may also include a Virtual Switch Controller (VSC) application to serve as the main point of contact for VNICs. Every component VM of VNS 400 may run an VSC application (422A, 422B, 442A, 442B), but only one VSC instance is active at a time. The "primary" VSC (e.g., 422B) directs the Replicator (REPL) node (e.g., 424B) in routing traffic, for example, by managing the tree structure of REPL nodes and maintaining a list of packet destinations. The REMF application designates the primary VSC and is configured to assign a new VSC should the primary VSC fail. According to alternative embodiments of the present invention, at least part of the REPL functions could be implemented in hardware accelerators (e.g., FPGAs and GPUs) in the cloud.

After its initial connection to the REMF, a VNIC may be handed off to the primary VSC. Should the primary VSC fail, the VNIC could re-connect to the REMF and another VSC is assigned. There could be multiple VSCs in a single VNS, and more importantly, the VSCs may not have stable network addresses due to the elastic nature of taking them up and down. Having one REMF (with a possible backup) per VNS provides a consistent point of contact for the VNIC. According to some embodiments of the present invention, one VNIC may be configured to connect to multiple VNS instances, which ensures continued connections to the overlay network even if one VNS fails.

Every component VM of VNS 400 may run an REPL node, also referred to as a REPL application, (424A, 424B, 444A, 444B) which is the main data mover in the overlay network and is responsible for fanout. The primary role of the REPL application is to process ingress packets, allow for inline filtering and manipulation of the packets, and finally deliver the packets to one or more destinations (fanout). The Packets can be at the L2 and above levels of the traditional OSI layers. The REPL node may also be where in-switch computing occurs. and the REPL node may support packet capture to local memory and/or to cloud storage for system diagnostics. As the main data mover, the REPL application may be implemented with a high-performance software design that uses one or more of kernel bypass techniques, custom kernel implementations, and hardware offload to accelerators such as FPGAs and GPUs to minimize latency and ensure consistent performance. For example, when using kernel bypass, the REPL application may ingest packets directly from the hardware NIC (bypassing the operating system (OS)), and to directly send packets to the hardware NIC (again, bypassing the OS). This approach is beneficial to both performance (extremely high packet rates) and latency (extremely low and consistent packet read/write times).

In a VNS, the flow of data packets from ingress to egress may preferably proceed through an elastic "tree" of REPL nodes. The tree may be formed from some or all available VMs and dynamically maintained by the algorithms running in the primary VSC of the VNS. The purpose of the tree structure is to expand the performance of the VNS instance beyond that of a single VM. Each successive tree level multiplies the total system performance by the number of nodes at that level. Each level is an additional multiplication of performance.

Figure 5A:
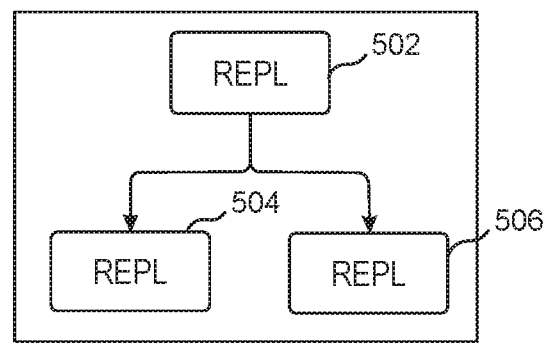
FIGS. 5A and 5B are tree diagrams illustrating exemplary configurations of replicator nodes for a virtual network switch according to embodiments of the present invention.
Figure 5B:
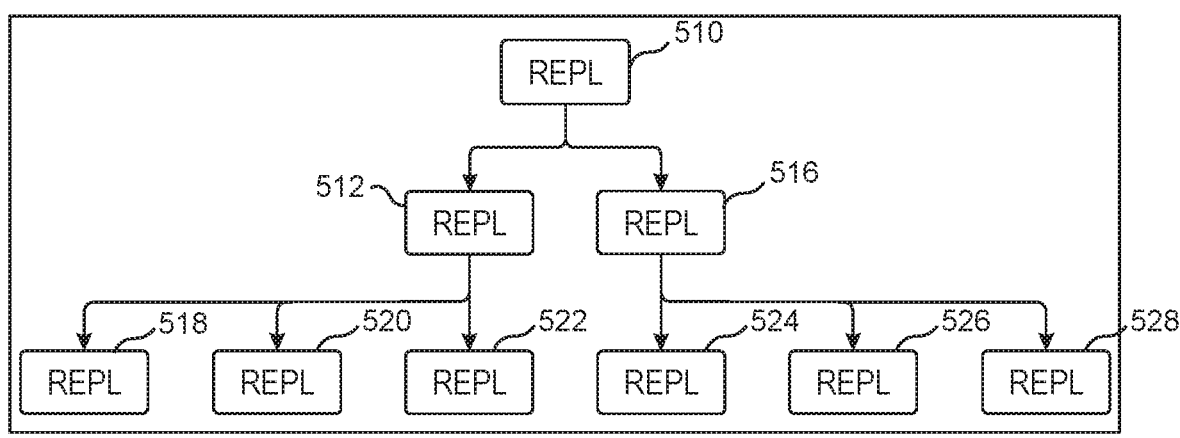

FIGS. 5A and 5B are tree diagrams illustrating exemplary configurations of replicator nodes for a virtual network switch according to some particular embodiments.

FIG. 5A shows a simple fanout tree consisting of two levels. The first replicator 502 may be associated with the primary VSC and handles initial ingress from all VNIC sources. The first layer of REPL node (502) only sends to the second layer of REPL nodes (504, 506), doubling (since there are two nodes in the second level) the performance of the system. Each node at the base of this tree can handle half of the total destinations for the fanout.

FIG. 5B shows a more complex three-layer tree of REPL nodes. As in the first case, the first replicator 510 may be associated with the primary VSC and handles initial ingress from all VNIC sources. The first layer of REPL node (510) only sends to the second layer of REPL nodes (512, 516), doubling (since there are two nodes in the second level) the performance of the system. Subsequently, each REPL node in the second layer sends to three additional nodes in the third layer (518, 520, 522, 524, 526, 528), increasing the system performance by six times (given that there are 6 nodes in the last layer).

According to some embodiments, the primary VSC may be responsible for picking the most appropriate tree structure based on the number of available REPL nodes and the real-time performance needs of the system. If an REPL node fails, the tree will be re-structured as needed to maintain the desirable performance. The tree structure chosen may take into consideration the underlaying cloud features. The exact VM types (e.g., CPU, Memory, Network, etc.) available will factor into picking the most appropriate tree form. According to certain implementations, a user may only need to specify a given level of performance and the VNS may set up the tree to meet that level of performance based on the most efficient scheme for the underlaying cloud infrastructure.

As mentioned above, another important component of an overlay network according to embodiments of the present invention is a VNIC instance installed in each processing endpoint (e.g., VM, software container, serverless compute function, or physical hardware) that needs to communicate on the overlay network. Each VNIC is programmed or configured to create and manage network connections between its corresponding processing endpoint (e.g., host VM) and one or more VNS instances.

Certain packet types (e.g., multicast packets or L2 (Ethernet) packets) are not allowed in cloud networks. As a result, packets of a disallowed type cannot be routed directly between VMs and will disappear if sent. To enable these types of packets to travel in a cloud network, the overlay network according to embodiments of the present invention may encapsulate the packet contents inside an allowed packet type (e.g., a User Datagram Protocol (UDP) packet), send the packet to a destination through the VNS, and then decapsulate the allowed packet to obtain the original packet. The process of encapsulation and decapsulation may be handled by the VNIC software in such a way as to require no changes to existing software on its host VM.

Figure 6A:
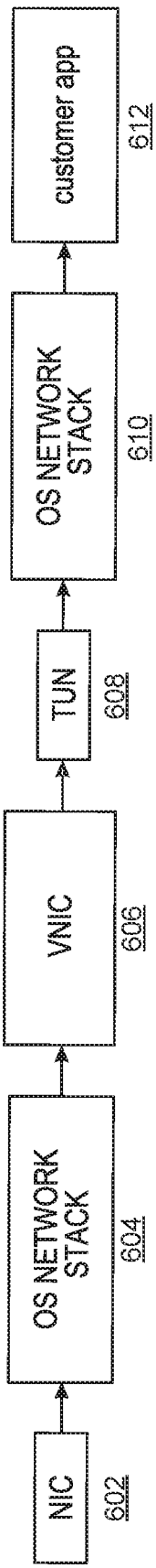
FIGS. 6A-6C are block diagrams illustrating exemplary implementations of virtual network interface controllers according to embodiments of the present invention.
Figure 6B:
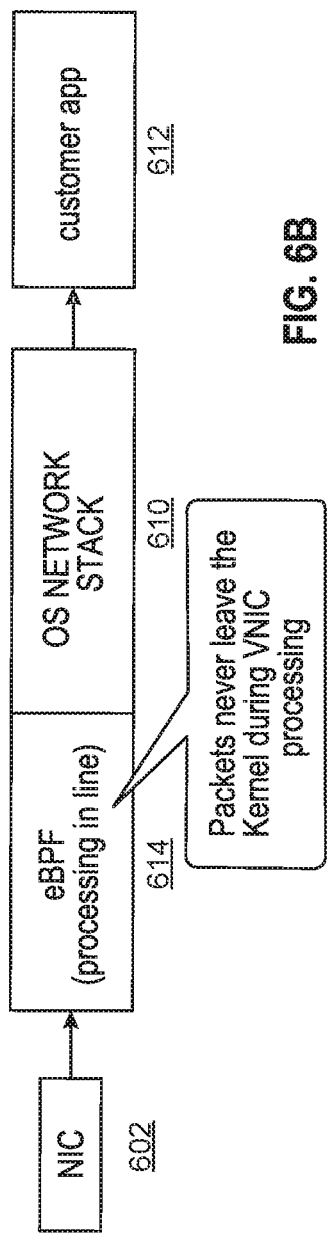
Figure 6C:
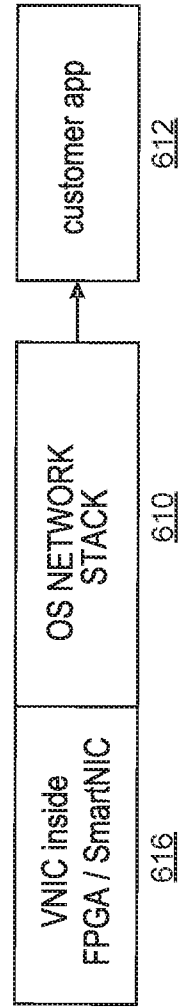

FIGS. 6A-6C are block diagrams illustrating exemplary implementations of virtual network interface controllers according to embodiments of the present invention.

One implementation of the VNIC software, as shown in FIG. 6A, may create a virtual "tunnel" network interface (608) for customer applications (612) to use. The VNIC software (606) may sit between the operating system network stack (604) (which receives data from the network interface controller (NIC) 602) and the tunnel (608) in order to perform the required encapsulation and decapsulation.

Another implementation of the VNIC functions, as shown in FIG. 6B, may handle the required encapsulation and decapsulation within the kernel by using advanced inline processing techniques such as eBPF (Enhanced Berkeley Packet Filters) (614).

Yet another implementation of the VNIC, as shown in FIG. 6C, may implement the VNIC functions inside an FPGA (Field Programmable Gate Array) or SmartNIC device (616). That is, the NIC (602) shown in FIGS. 6A-6B may be replaced with the FPGA/SmartNIC (616). The VNIC functions would run inside the FPGA/SmartNIC with a small controller application running in the corresponding VM. This implementation may be similar to the one shown in FIG. 6B but with an FPGA/SmartNIC (616) running the equivalent eBPF code (614).

In addition to the implementation types shown in FIGS. 6A-6C, another type of VNIC implementation is to provide a custom application programming interface (API) for directly sending and receiving packets to and from a VNS, bypassing the OS. For example, this implementation may be achieved with an remote direct memory access (RDMA) over converged Ethernet (RoCE) API to realize a hybrid kernel bypass. In the alternative, the Linux high performance library, Data Plane Development Kit (DPDK) may provide for direct access to the NIC, or the Windows driver, eXpress Data Path (XDP), may enable a more direct path to packets.

The addition of kernel bypass to the VNIC may help customer applications to achieve much higher packet processing rates than would otherwise be possible if data packets had to travel through the OS networking software.

Kernel bypass techniques, as applied to the VNS and/or VNIC instances, may be used to flood data packets through the VM or container's networks with little additional load to their computing requirements. Moving network processing into the VNS can reduce the burden on endpoint developers to provide those functions. This simplifies programming and allows smaller VM sizes to be selected.

According to embodiments of the present invention, the virtual network switch architecture described herein may enable significant in-network compute capabilities and network-enhancement opportunities. In-network compute refers to running arbitrary and dynamic user code in a switch that can inspect each packet as it travels through the switch. The results of executing the code can be any of the following: drop the packet (i.e., filter), modify the packet (e.g., change its destination or content), count the packet (i.e., metrics), capture the packet, or pass the packet through un-changed.

According to certain embodiments, in-network compute can also be used to provide a security layer on a network. For example, arbitrary code can be run in a VNS and/or VNIC to inspect the packets and prevent bad packets from reaching their destination(s).

According to some embodiments of the present invention, VNS and VNIC components may provide a convenient and efficient place to include time-synchronization features for the overlay network. To achieve time synchronization properly, a very accurate measurement of the transmission latency is required between the two nodes being synchronized. Such latency can be measured with substantial precision as part of the normal operations of the VNS-VNIC architecture.

According to other embodiments, the VNS-VNIC architecture may allow for optional encryption of communications between any two processing endpoints. According to further embodiments, the VNS-VNIC architecture enables consistent network behavior across different cloud network systems by hiding the inconsistencies and normalizing the behavior so that client applications will work the same—without code changes—on every cloud network. A central switch arrangement also provides a convenient way to monitor network traffic and to capture network traffic, as can be achieved with the VNS-VNIC architecture described herein.

According to further embodiments, the protocol used to pass data between VNIC and VNS and between two or more VNS instances may be independent of the protocol used by the customer/user applications. This may be enabled with the encapsulation and decapsulation techniques as described above. The inter-connection protocols can be dynamically changed based on the network topology and the real-time network characteristics. For example, UDP may be used as the inter-connection protocol for traffic that stays within a single cloud region since UDP is light-weight and fast. However, UDP may not be appropriate for traffic that needs to travel between clouds or between different cloud regions where Transmission Control Protocol (TCP) or QUIC may be better choices. For video packets, a protocol like Secure Reliable Transport (SRT) may be more desirable. By making the inter-connection protocol independent of the user protocol(s), the overlay network can automate the interconnection protocol selection process, for example, based on network topology and network conditions.

Furthermore, the VNS-VNIC architecture may be employed to manipulate the low-level packets (below protocols such as UDP, TCP and QUIC) for the interconnect between nodes in a way that mitigates congestion in the physical network underneath the virtual network. Even though how the physical network is put together (e.g., the arrangement of switches and routers) is unknown, it is expected that packets with the same addressing tuple (i.e., combination of source, destination, and type) will typically travel the same path through the network(s). This path is determined by a "hash" of the addressing tuple. By monitoring the latency and bandwidth of a given addressing tuple, the congested routes through the underlaying physical network could be mapped and detected. Then, by manipulating the addressing tuple, the VNS may re-route the packets around the detected congestion. The VNS may also spread a single flow (i.e., a single addressing tuple) across multiple tuples in order to minimize the effects of congestion for any single path. This implementation may be beneficial to high-bandwidth flows that have the potential to overload any given route. By spreading the high-bandwidth flow across multiple tuples, and by monitoring the tuples for congestion (latency/bandwidth), the interconnect transport may be improved or even optimized for the underlaying physical network, without requiring the knowledge of the exact topology or configuration of the underlying physical network(s).

In addition, the VNS-VNIC architecture may be run on networks other than Ethernet (which is currently the most prevalent cloud network type). Instead, the VNS-VNIC architecture may be implemented on InfiniBand networks in the cloud (used for high-performance compute nodes) and be used to bridge InfiniBand networks and Ethernet networks.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. An overlay network comprising:
at least one virtual network switch (VNS), each VNS being installed within a corresponding first processing endpoint which is logically above a virtualization layer of a virtual network, the VNS being implemented as at least one application running on at least one virtual machine and configured to intercept and switch data packets transmitted on or above the data link layer (L2) of traditional OSI model, thereby performing packet switching among the virtual network of virtual machines and above a physical layer,
wherein the VNS comprises:
(a) a first manager element configured to connect to at least one virtual network interface controller (VNIC), each VNIC being installed within a corresponding second processing endpoint which is also logically above the virtualization layer of the virtual network, the second processing endpoint being separate from the first processing endpoint;
(b) a first replicator node configured to replicate and route the data packets; and
(c) a first switch controller configured to control the first replicator node.

2. The overlay network of claim 1, wherein each VNS comprises a network virtual appliance configured to execute over one or more virtual machines.

3. The overlay network of claim 2, wherein the at least one VNS is configured to be scaled by adding or removing virtual machines over which the VNS executes, thereby respectively increasing or decreasing a speed and/or a capacity of the overlay network.

4. The overlay network of claim 1, wherein the at least one VNS comprises multiple VNSs which are configured to form a mesh.

5. The overlay network of claim 1, wherein each VNIC connects the corresponding second processing endpoint to the VNS.

6. The overlay network of claim 5, wherein each VNIC facilitates data packet delivery to and/or retrieval from the corresponding second processing endpoint.

7. The overlay network of claim 1, wherein the VNS comprises a plurality of replicator nodes including the first replicator node.

8. The overlay network of claim 7, wherein the plurality of replicator nodes are dynamically assembled into a tree configuration in response to a change in demand for communication speed and/or capacity of the VNS.

9. The overlay network of claim 1, wherein the first processing endpoint comprises at least one virtual machine, software container, serverless compute function, or physical hardware.

10. The overlay network of claim 1, wherein each VNS is configured to filter, modify, or capture the data packets or to provide in-switch computing functionality.

11. A method for operating an overlay network, the overlay network comprising at least one virtual network switch (VNS), each VNS being installed within a corresponding first processing endpoint which is logically above a virtualization layer of a virtual network, the method comprising:

connecting, by a first manager element of the VNS, to at least one virtual network interface controller (VNIC), each VNIC being installed within a corresponding second processing endpoint which is also logically above the virtualization layer of the virtual network, the second processing endpoint being separate from the first processing endpoint, wherein the VNS is implemented as at least one application running on at least one virtual machine and configured to intercept and switch data packets transmitted on or above the data link layer (L2) of traditional OSI model, thereby performing packet switching among the virtual network of virtual machines and above a physical layer;

replicating, by a first replicator node of the VNS, data packets received from the at least one VNIC; and routing, by the first replicator node, the data packets according to control by a first switch controller of the VNS.

12. The method of claim 11, wherein each VNS comprises a network virtual appliance configured to execute over one or more virtual machines.

13. The method of claim 12, further comprising:

scaling the at least one VNS by adding or removing one or more virtual machines over which the VNS executes, thereby respectively increasing or decreasing a speed and/or a capacity of the overlay network.

14. The method of claim 11, wherein the at least one VNS comprises multiple VNSs which are configured to form a mesh.

15. The method of claim 11, wherein each VNIC connects the corresponding second processing endpoint to the VNS.

16. The method of claim 15, wherein each VNIC facilitates data packet delivery to and/or retrieval from the corresponding second processing endpoint.

17. The method of claim 11, wherein the VNS comprises a plurality of replicator nodes including the first replicator node.

18. The method of claim 17, wherein the plurality of replicator nodes are dynamically assembled into a tree configuration in response to a change in demand for communication speed and/or capacity of the VNS.

19. The method of claim 11, wherein the first processing endpoint comprises at least one virtual machine, software container, serverless compute function, or physical hardware.

20. The method of claim 11, wherein each VNS is configured to filter, modify, or capture the data packets or to provide in-switch computing functionality.

\* \* \* \* \*